United States Patent
Tsai et al.

(10) Patent No.: US 8,107,963 B2
(45) Date of Patent: Jan. 31, 2012

(54) MOBILE COMMUNICATION APPARATUS, METHOD, AND COMPUTER READABLE MEDIUM THEREOF FOR EARLY MEASURING SIGNAL OF A BASE STATION

(75) Inventors: Kun-Chan Tsai, Chiayi (TW); Chia-Hsiang Chang, Taipei (TW)

(73) Assignee: Institute for Information Industry, Taipei (TW)

( * ) Notice: Subject to any disclaimer, the term of this patent is extended or adjusted under 35 U.S.C. 154(b) by 812 days.

(21) Appl. No.: 11/750,786

(22) Filed: May 18, 2007

(65) Prior Publication Data
US 2008/0146233 A1 Jun. 19, 2008

(30) Foreign Application Priority Data
Dec. 19, 2006 (TW) .............................. 95147623 A

(51) Int. Cl.
*H04W 36/00* (2009.01)

(52) U.S. Cl. ................... 455/437; 342/457; 342/450

(58) Field of Classification Search .................. 370/335, 370/342, 337, 208; 455/445, 522; 375/347, 375/146, 130; 342/457
See application file for complete search history.

(56) References Cited

U.S. PATENT DOCUMENTS

| | | | | |
|---|---|---|---|---|
| 5,396,253 A * | 3/1995 | Chia | ............................. | 342/104 |
| 5,557,657 A * | 9/1996 | Barnett | ........................ | 455/444 |
| 6,006,096 A * | 12/1999 | Trompower | ............... | 455/456.2 |
| 6,631,266 B1 * | 10/2003 | Lee et al. | ....................... | 455/446 |
| 6,952,181 B2 * | 10/2005 | Karr et al. | ...................... | 342/457 |
| 7,525,484 B2 * | 4/2009 | Dupray et al. | ................ | 342/450 |
| 2001/0012781 A1 * | 8/2001 | Suzuki | ......................... | 455/456 |
| 2002/0127967 A1 * | 9/2002 | Najafi | ........................... | 455/3.05 |
| 2004/0185865 A1 * | 9/2004 | Maanoja | ..................... | 455/452.2 |
| 2005/0288037 A1 * | 12/2005 | Marinier | .................... | 455/456.2 |
| 2006/0009235 A1 * | 1/2006 | Sheynblat et al. | ......... | 455/456.1 |
| 2007/0002868 A1 * | 1/2007 | Qian et al. | ............... | 370/395.21 |

* cited by examiner

*Primary Examiner* — Nick Corsaro
*Assistant Examiner* — Mahendra Patel
(74) *Attorney, Agent, or Firm* — Patterson Thuente Christensen Pedersent, P.A.

(57) ABSTRACT

A positioning module positions a location of a mobile communication apparatus. A processor determines whether the location falls within a predetermined range, wherein the predetermined range is equal to or greater than an effective communication coverage of a neighboring base station. If the processor determines that the location is within the predetermined range, a signal detection module measures the signal from the neighboring base station. By detecting the signals of the neighboring base stations earlier, the present invention is able to function while the mobile communication apparatus moves at high speeds and successfully switch the connections between the base stations.

12 Claims, 4 Drawing Sheets

MOBILE COMMUNICATION APPARATUS, METHOD, AND COMPUTER READABLE MEDIUM THEREOF FOR EARLY MEASURING SIGNAL OF A BASE STATION

This application claims the benefit of priority based on Taiwan Patent Application No. 095147623 filed on Dec. 19, 2006 of which the contents are incorporated herein by reference in its entirety.

CROSS-REFERENCES TO RELATED APPLICATIONS

Not applicable.

BACKGROUND OF THE INVENTION

1. Field of the Invention

The present invention relates to a mobile communication apparatus, a method, and a computer readable medium thereof; more specifically, it relates to a mobile communication apparatus, a method, and a computer readable medium thereof for early measuring a signal of a base station to determine whether to change connections.

2. Descriptions of the Related Art

With the universality of mobile communications, there have been increasingly more types of and more numbers of mobile communication apparatuses that have been developed. Currently, most mobile communication apparatuses on the market, such as mobile communication apparatuses adopting globe system for mobile communications (GSMs), wideband code division multiple accesses (WCDMAs), general packet radio services (GPRSs), personal handy-phone systems (PHSs), or worldwide interoperability for microwave accesses (WiMAXs), provide services, such as wireless voice, wireless video, and data communication, through base stations. Any of these mobile communication apparatuses can access various related services via the mobile communication network system once a connection with a base station has been established.

However, the mobile communication apparatus must handoff from one base station to another base station to ensure that communication services will not disconnect while the mobile communication apparatus moves among the base stations. FIG. 1 depicts a common connection between a mobile communication apparatus and a base station. FIG. 1 includes a first base station 101, a second base station 103, a mobile communication apparatus 105, and a base station controller 107. The first base station 101 has an effective communication coverage 100. The second base station 103 has an effective communication coverage 102. The base station controller 107 commands the mobile communication apparatus 105 to measure signals of neighboring base stations and to report measured results. After that, the base station controller 107 commands the mobile communication apparatus 105 to switch the connection according to the measured results of the base stations. For example, the mobile communication apparatus 105 can be originally within the effective communication coverage 100 of the first base station 101, and be able to establish a connection with the first base station 101 to access communication services. If the mobile communication apparatus 105 starts moving closer to the second base station 103 and moving into an overlap area 104 of the effective communication coverage 100 of the first base station 101 and the effective communication coverage 102 of the second base station 103, the base station controller 107 will command the mobile communication apparatus 105 to measure the signals of neighboring base stations and to report the measured results, which comprise signals of the first base station 101 and the second base station 103. The mobile communication apparatus 105 measures that both the signals from the first base station 101 and the signal from the second base station 103 can be available in the overlap area 104. When the signal from the second base station 103 has priority over the signal from the first base station 101, the mobile communication apparatus 105 will switch the connection. That is, the base station controller 107 commands the mobile communication apparatus 105 to switch the connection from connecting with the first base station 101 to connecting with the second base station 103 so that the communication between the mobile communication apparatus 105 and the preferred base station can be maintained.

The aforementioned procedure of switching connections is a common technique for mobile communication systems. If the fast moving mobile communication apparatus 105 moves through the overlap area 104 too quickly, the base station controller 107 is too late to command the mobile communication apparatus 105 to measure and report the signals of neighboring base stations. As a result, the mobile communication apparatus 105 will leave the effective communication coverage 100 of the first base station 101. Therefore, there will be a failure in switching connections and results in the discontinuity of the communication service taken by the mobile communication apparatus 105.

Therefore, a method for creating a mobile communication apparatus that can not only measure signals of neighboring base stations in time during high speed movement, but also smoothly switch connections among the base stations is still needed.

SUMMARY OF THE INVENTION

One objective of this invention is to provide a method for early measuring a signal of a base station. The method comprises the following steps of: positioning a location of a mobile communication apparatus; determining whether the location is within a predetermined range, wherein the predetermined range is equal to or greater than an effective communication coverage of the base station; and measuring the signal of the base station if the location is determined to be within the predetermined range.

Another objective of this invention is to provide a computer readable medium for storing a computer program. The computer program enables a mobile communication apparatus to execute a method for early measuring a signal of a base station. The method comprises the following steps of: positioning a location of the mobile communication apparatus; determining whether the location is within a predetermined range, wherein the predetermined range is equal to or greater than an effective communication coverage of the base station; and measuring the signal of the base station if the location is determined to be within the predetermined range.

Yet a further objective of this invention is to provide a mobile communication apparatus. The mobile communication apparatus comprises a positioning module, a processor, and a signal detection module. The positioning module is used for positioning a location of the mobile communication apparatus. The processor is used for determining whether the location is within a predetermined range, wherein the predetermined range is equal to or greater than an effective communication coverage of a base station. The signal detection module is used for measuring a signal of a base station if the processor determines that the location is within the predetermined range.

The present invention is capable of detecting the location of the mobile communication apparatus by a positioning system to determine whether the mobile communication apparatus is moving and whether the mobile communication apparatus is approaching to effective coverages of other neighboring base stations. When the mobile communication apparatus moves closer to the effective coverages of other neighboring base stations, the mobile communication apparatus will disconnect from its original base station. The mobile communication apparatus will start to measure the signals of neighboring base stations early so that the connection between the mobile communication apparatus and base station can be switched more quickly. Accordingly, the mobile communication apparatus can not only measure the signals of neighboring base stations early according to the position information and the information from the base station deployment map during high speed movement, but also switch the connection quickly and smoothly. As a result of the smooth switch in connections, voice communication and data transmissions will not be disconnected because the connections are maintained.

The detailed technology and preferred embodiments implemented for the subject invention are described in the following paragraphs accompanying the appended drawings for people skilled in the art to well appreciate the features of the claimed invention.

DESCRIPTION OF THE PREFERRED EMBODIMENT

In this specification, the term "according to" is defined as "replying to" or "reacting to." For example, "according to a signal" means "replying to a signal" or "reacting to a signal" without necessity of a direct signal reception.

Figure 1:
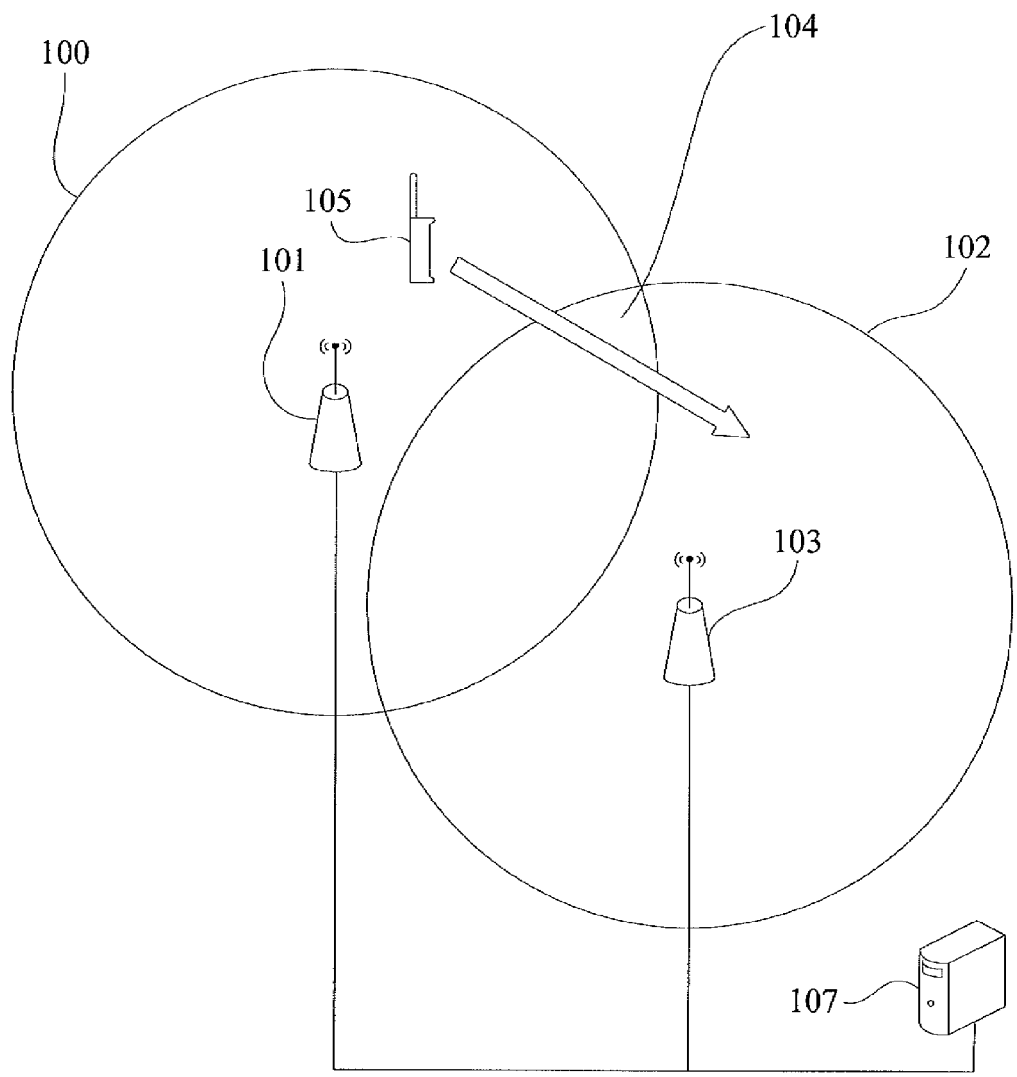
FIG. 1 is a schematic diagram illustrating conventional connections among a mobile communication apparatus and base stations.
Figure 2:
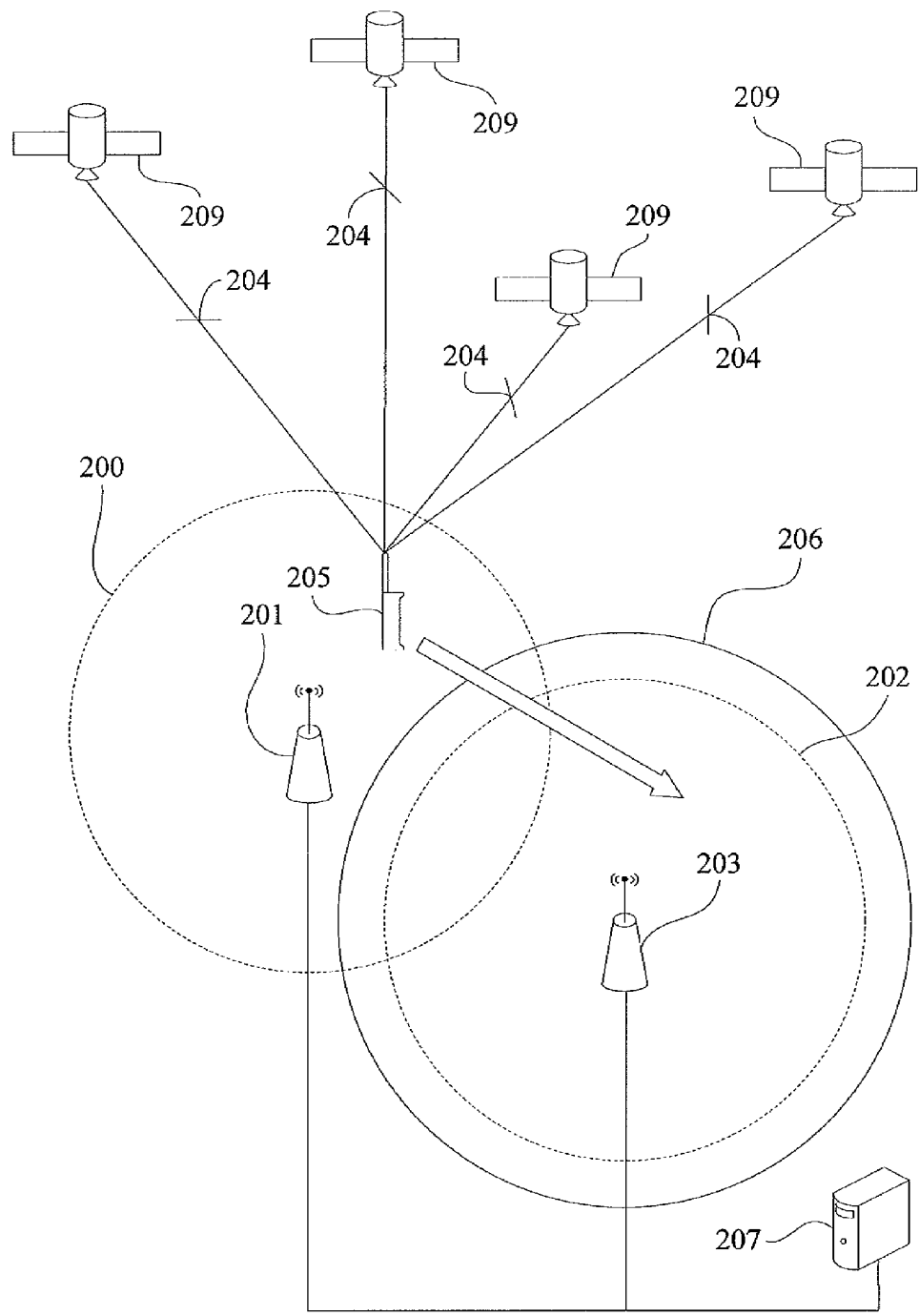
FIG. 2 is a schematic diagram illustrating a communication system of a first embodiment of this invention.

A first embodiment of this invention is shown in FIG. 2, which is a communication system. The communication system can be a mobile communication system which uses globe system for mobile communications (GSMs), wideband code division multiple accesses (WCDMAs), general packet radio services (GPRSs), personal handy-phone systems (PHSs), or worldwide interoperability for microwave accesses (WiMAXs). The communication system comprises a first base station 201, a second base station 203, a mobile communication apparatus 205, and a base station controller 207. The first base station 201 has a first effective communication coverage 200. The second base station 203 has a second effective communication coverage 202. The mobile communication apparatus 205 can receive satellite signals 204 broadcasted by a plurality of satellites 209. The mobile communication apparatus 205 can be a personal digital assistant with communication and positioning capability, a mobile phone with positioning capability, or a laptop with communication and positioning capability.

Figure 3:
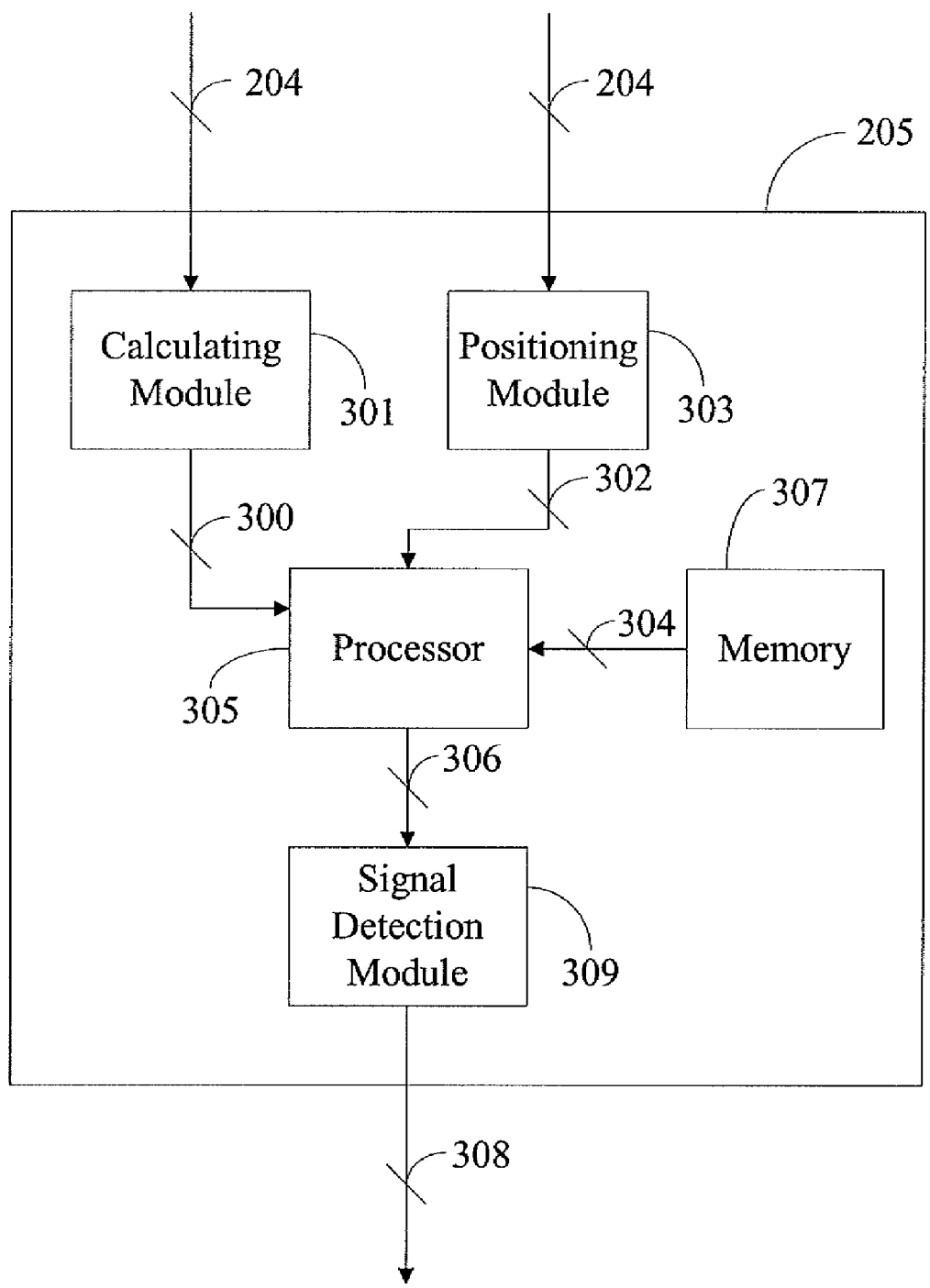
FIG. 3 is a schematic diagram illustrating a mobile communication apparatus of the first embodiment of this invention.

The mobile communication apparatus 205 is shown in FIG. 3, which comprises a calculating module 301, a positioning module 303, a processor 305, a memory 307, and a signal detection module 309. The calculating module 301 calculates the moving speed of the mobile communication apparatus 205 according to the satellite signals 204. For example, the calculating module 301 uses a moving distance per unit time of the front satellite signal 204 and the rear satellite signal 204 to calculate the moving speed of the mobile communication apparatus 205, and transmits a speed signal 300 to the processor 305. The positioning module 303 positions the location of the mobile communication apparatus 205 according to the satellite signals 204, and transmits a location signal 302 to the processor 305. The memory 307 stores a base station deployment map 304 which records the first effective communication coverage 200, the second effective communication coverage 202, and locations of the first base station 201 and the second base station 203. The base station deployment map 304 can be stored or burned into the memory 307 while the mobile communication apparatus 205 is manufactured, or can be inputted into the memory 307 via various ways by a user. For example, the base station deployment map 304 can be downloaded into the memory 307 via a network or transmitted to the memory 307 directly by a mobile communication operator.

As shown in FIG. 2, the mobile communication apparatus 205 is within the first effective communication coverage 200, and is originally connected to the first base station 201. When the processor 305 determines that the moving speed of the mobile communication apparatus 205 is equal to or greater than a predetermined moving speed, it means that the mobile communication apparatus 205 is moving too quickly for the base station controller 207 to command the mobile communication apparatus 205 to measure the signals of neighboring base stations in time. It is noted that the predetermined moving speed can also be set while the mobile communication apparatus 205 is manufactured, or be inputted into the processor 305 of the mobile communication apparatus 205 by the user.

The processor 305 will check the base station deployment map 304 according to the location signal 302 to determine whether the location of the mobile communication apparatus 205 is within the predetermined range 206, when the moving speed of the mobile communication apparatus 205 is equal to or greater than the predetermined moving speed. In this embodiment, the predetermined range 206 is set according to the second effective communication coverage 202 that is recorded in the base station deployment map 304 of the memory 307. The present invention does not limit the value of the predetermined range 206. The predetermined range 206 can be any range which is equal to or greater than the second effective communication coverage 202. In addition, the present invention does not limit the setting of the predetermined range 206 at any particular base station. Although this embodiment describes two base stations, those skilled in the art can easily realize how to set the predetermined range of any base station within a communication system comprising a plurality of base stations.

In this embodiment, in order to respond to the high speed movement of the mobile communication apparatus 205, the predetermined range 206 is set to be greater than the second effective communication coverage 202 so that the mobile communication apparatus 205 is able to measure the signals from the second base station 203 earlier and report the measured result to the base station controller 207. The connection with the base stations is thus, switched as early as possible. The processor 305 transmits a control signal 306 to the signal detection module 309 when the processor 305 determines that the mobile communication apparatus 205 is within the predetermined range 206. After receiving the control signal 306, the signal detection module 309 starts to measure the signals from the second base station 203. Again, the present invention does not necessarily require the signal detection module 309 to measure the signal from the second base station 203. Those skilled in the art can easily realize the relationship between the predetermined range 206 of the mobile communication apparatus 205 and the signals of the base stations that the signal detection module 309 measures. Therefore, the descriptions for these operations and functions are redundant and not repeated herein.

Since the mobile communication apparatus 205 measures the signals from the second base station 203 earlier, it can detect signals from the second base station 203 earlier than the apparatus of the prior art. After detecting signals of the second base station 203, the signal detection module 309 reports the measured results 308 to the base station controller 207 periodically. The base station controller 207 determines whether one of the signals of the second base station 203 is strong enough for the mobile communication apparatus 205 to switch the connection to according to the measured results 308. If the signal of the second base station 203 is determined to be strong enough, the base station controller 207 commands the mobile communication apparatus 205 to switch the connection from the first base station 201 to the second base station 203.

The aforementioned signals can be presented by received signal strength indications (RSSIs), received signal code powers (RSCPs), carrier-to-noise ratios ($E_c/N_o$s), or any other measuring units which are capable of presenting signal strengths or quality. Those skilled in the art can use the aforementioned measuring units to understand the strength or quality of the signals from the base stations.

Figure 4:
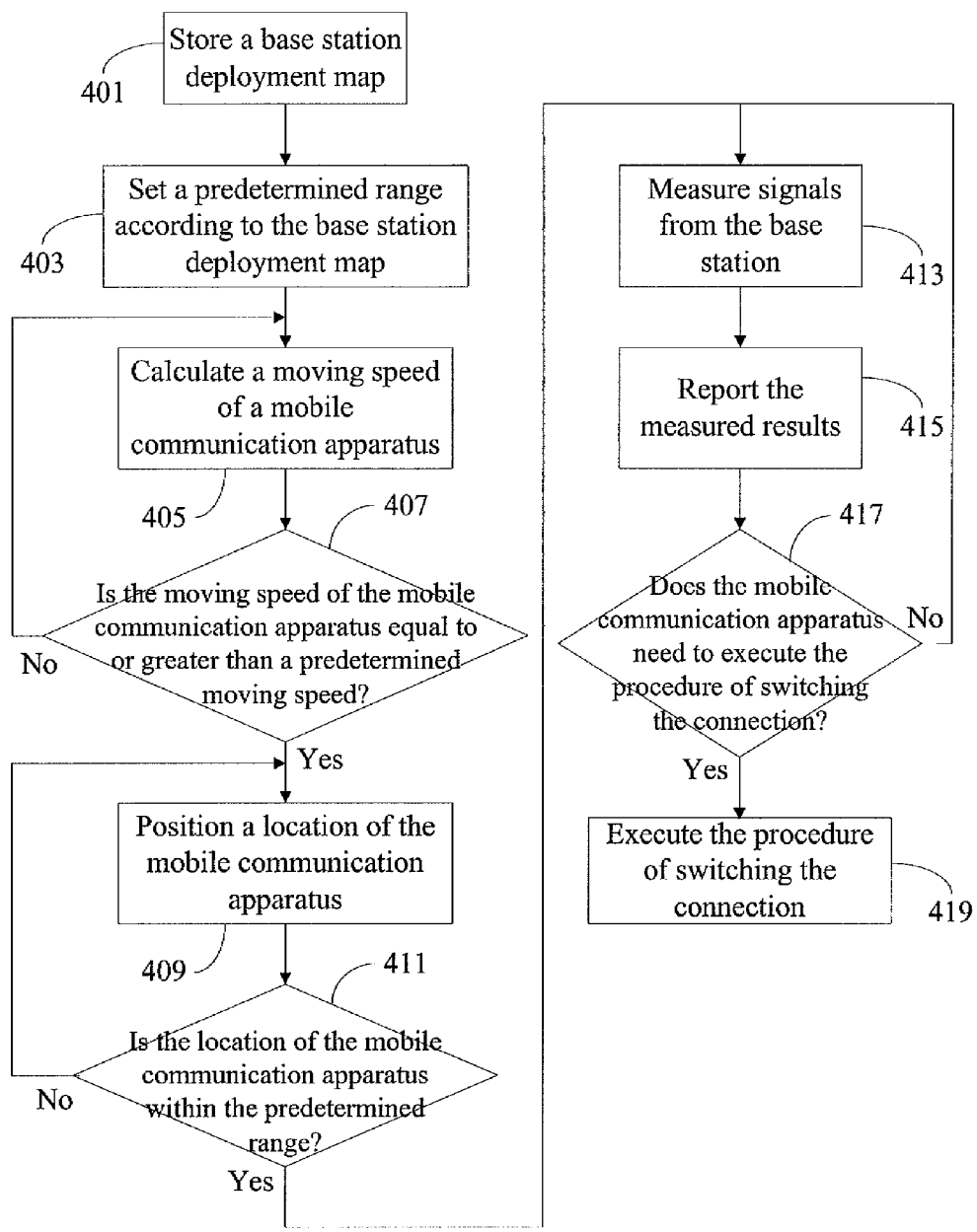
FIG. 4 is a flow chart illustrating a second embodiment of this invention.

A second embodiment of this invention is to provide a method for measuring the signal of a base station earlier. The method is applied to the mobile communication apparatus 205 as described in the first embodiment by a computer program that controls each module of the mobile communication apparatus 205. The corresponding flow chart is shown in FIG. 4.

First, step 401 is executed for the memory 307 to store a base station deployment map 304. Next, step 403 is executed so that the processor 305 can set a predetermined range 206 according to the base station deployment map 304. Then, step 405 enables the calculating module 301 to calculate the moving speed of the mobile communication apparatus 205 according to the satellite signals 204. Step 407 enables the processor 305 to determine whether the moving speed of the mobile communication apparatus 205 is equal to or greater than a predetermined moving speed. The predetermined moving speed is set in the same way as that of the first embodiment and is not repeated again. If so, step 409 is executed for the positioning module 303 to position the location of the mobile communication apparatus 205 according to the satellite signals 204. Next, step 411 is executed for the processor 305 to determine whether the location of the mobile communication apparatus 205 is within the predetermined range 206. If so, step 413 is executed so that the signal detection module 309 can measure the signals from the base station. Then, step 415 is executed for the mobile communication apparatus 205 to report the measured results to the base station controller 207. Next, step 417 is executed so that the base station controller 207 can determine whether the mobile communication apparatus 205 needs to switch the connections between the base stations according to the measured results. If the mobile communication apparatus 205 has to switch connections, step 419 is executed.

In step 407, if the moving speed of the mobile communication apparatus 205 is determined to be smaller than the predetermined moving speed, step 405 enables the calculating module 301 to calculate the moving speed of the mobile communication apparatus 205 according to the satellite signals 204. Step 407 then uses the processor 305 to continuously determine whether the moving speed of the mobile communication apparatus 205 is equal to or greater than the predetermined moving speed.

In step 411, if the location of the mobile communication apparatus 205 is determined not to fall within the predetermined range 206, then step 409 uses the positioning module 303 to continuously position the location of the mobile communication apparatus 205.

Finally, in step 417, if the base station controller 207 determines that the mobile communication apparatus 205 does not need to switch the connections, step 413 is executed to continuously allow the signal detection module 309 to measure signals from the base station. In addition to the steps depicted in FIG. 4, the second embodiment can also execute all the operations of the first embodiment. Those skilled in the art can understand the corresponding steps and operations of the second embodiment by following the descriptions of the first embodiment, and thus no unnecessary detail is given.

A third embodiment of this invention is to provide another method for measuring the signals from the base station earlier. A flow chart of this method is also shown in FIG. 4.

First, step 401 is executed for storing a base station deployment map. Next, step 403 is executed for setting a predetermined range according to the base station deployment map. Then, step 405 is executed for calculating a moving speed of a mobile communication apparatus. Following, step 407 is executed for determining whether the moving speed of the mobile communication apparatus is equal to or greater than a predetermined moving speed. If so, step 409 is executed for positioning a location of the mobile communication apparatus. Next, step 411 is executed for determining whether the location of the mobile communication apparatus falls within the predetermined range. If so, step 413 is executed for measuring the measured signal from the base station. Then, step 415 is executed for reporting the measured results. Next, step 417 is executed for determining whether the mobile communication apparatus needs to switch the connections. If the mobile communication apparatus has to switch connections, step 419 is executed.

In step 407, if the moving speed of the mobile communication apparatus is determined to be smaller than the predetermined moving speed, then the method returns to step 405 for continuously calculating the moving speed of the mobile communication apparatus and then executes step 407 for determining whether the moving speed of the mobile communication apparatus is equal to or greater than a predetermined moving speed.

In step 411, if the location of the mobile communication apparatus is determined not to fall within the predetermined range, step 409 is returned for continuously positioning the location of the mobile communication apparatus.

Finally, in step 417, if the mobile communication apparatus does not have to switch connections, step 413 is executed for continuously measuring the signals from the base station.

In addition to the steps depicted in FIG. 4, the third embodiment can also execute all the operations of the first embodiment. Those skilled in the art can understand the corresponding steps or operations of the third embodiment by following the descriptions of the first embodiment, and thus, no unnecessary detail is given further.

The above methods can be implemented by using a product that can store a computer program for executing the aforesaid steps. The computer program product can be a floppy disk, a hard disk, an optical disc, a flash disk, a tape, a network accessible database or a storage medium with the same functionality which can be easily thought by people skilled in the field.

Accordingly, the present invention is capable of detecting the location and the speed of the mobile communication apparatus by using a positioning system, and determining whether the mobile communication apparatus moves into the effective coverages of other neighboring base stations by comparing the above data with the locations and effective coverages of base stations stored in the base station deployment map. When the mobile communication apparatus moves closer to the effective coverages of other neighboring base stations, the mobile communication apparatus will disconnect with its original base station. The mobile communication apparatus will measure the signals of its neighboring base stations earlier so that the switch in connections can be executed earlier. Accordingly, the mobile communication apparatus can not only measure the signals of neighboring base stations earlier according to the position information and the information of a base station deployment map during high speed movement, but also switch the connection among base stations smoothly. As a result, voice communication and data transmissions will not be disconnected because the connection is switched smoothly.

The above disclosure is related to the detailed technical contents and inventive features thereof. People skilled in the art may proceed with a variety of modifications and replacements based on the disclosures and suggestions of the invention as described without departing from the characteristics thereof Nevertheless, although such modifications and replacements are not fully disclosed in the above descriptions, they have substantially been covered in the following claims as appended.

What is claimed is:

1. A method for early measuring a signal of a base station, comprising the steps of:
    calculating a moving speed of a mobile communication apparatus by the mobile communication apparatus;
    determining whether the moving speed is equal to or greater than a predetermined moving speed by the mobile communication apparatus;
    positioning a location of the mobile communication apparatus by the mobile communication apparatus while the moving speed is determined equal to or greater than the predetermined moving speed;
    determining whether the location is within a predetermined range by the mobile communication apparatus based on a base station deployment map stored in the mobile communication apparatus, wherein the base station deployment map records a location and an effective communication coverage of the base station, and the predetermined range is equal to or greater than the effective communication coverage of the base station; and
    measuring the signal of the base station by the mobile communication apparatus if the location is determined within the predetermined range.

2. The method as claimed in claim 1, wherein the signal is one of a received signal strength (RSSI), a received signal code power (RSCP), and a carrier-to-noise ratio (Ec/N0).

3. The method as claimed in claim 1, the determining step further comprising the steps of:
    setting the predetermined range by the mobile communication apparatus according to the effective communication coverage of the base station.

4. A non-transitory computer readable medium storing a computer program for a mobile communication apparatus to execute a method for early measuring a signal of a base station, the method comprising the steps of:
    calculating a moving speed of the mobile communication apparatus;
    determining whether the moving speed is equal to or greater than a predetermined moving speed;
    positioning a location of the mobile communication apparatus while the moving speed is determined equal to or greater than the predetermined moving speed;
    determining whether the location is within a predetermined range based on a base station deployment map stored in the mobile communication apparatus, wherein the base station deployment map records a location and an effective communication coverage of the base station, and the predetermined range is equal to or greater than the effective communication coverage of the base station; and
    measuring the signal of the base station if the location is determined within the predetermined range.

5. The non-transitory computer readable medium as claimed in claim 4, wherein the signal is one of a received signal strength, a received signal code power, and a carrier-to-noise ratio.

6. The non-transitory computer readable medium as claimed in claim 4, the determining step further comprising the steps of:
    setting the predetermined range according to the effective communication coverage of the base station.

7. A mobile communication apparatus, comprising:
    a calculating module for calculating a moving speed of the mobile communication apparatus;
    a processor for determining whether the moving speed is equal to or greater than a predetermined moving speed;
    a positioning module for positioning a location of the mobile communication apparatus while the moving speed is determined equal to or greater than the predetermined moving speed, wherein the processor further determines whether the location is within the predetermined range based on a base station deployment map stored in a memory of the mobile communication apparatus, the base station deployment map records a location and an effective communication coverage of the base station, and the predetermined range is equal to or greater than the effective communication coverage of the base station; and
    a signal detection module for measuring a signal of the base station if the processor determines that the location is within the predetermined range.

8. The mobile communication apparatus as claimed in claim 7, wherein the signal is one of a received signal strength, a received signal code power, and a carrier-to-noise ratio.

9. The mobile communication apparatus as claimed in claim 7, wherein the processor sets the predetermined range according to the effective communication coverage of the base station.

10. The mobile communication apparatus as claimed in claim 9, wherein the base station deployment map is transmitted to the memory by a mobile communication operator.

11. The mobile communication apparatus as claimed in claim 9, wherein the base station deployment map is downloaded into the memory via a network by a user.

12. The mobile communication apparatus as claimed in claim 9, wherein the base station deployment map is stored in the memory while the mobile communication apparatus is manufactured.

* * * * *